United States Patent [19]
Jones

[11] Patent Number: 5,972,211
[45] Date of Patent: Oct. 26, 1999

[54] WATER FILTRATION SYSTEM

[76] Inventor: Terry L. Jones, 5014 Good Hope Rd., Decatur, Miss. 39327

[21] Appl. No.: 09/040,929

[22] Filed: Mar. 19, 1998

[51] Int. Cl.[6] ............................ B01D 17/12; B01D 24/10; B01D 24/46
[52] U.S. Cl. ............................. 210/90; 210/94; 210/96.1; 210/263; 210/275; 210/290; 210/333.01; 210/497.01
[58] Field of Search .................................. 210/90, 93, 94, 210/96.1, 97, 106, 108, 170, 263, 264, 275, 277, 283, 284, 290, 332, 333.01, 340, 341, 411, 437, 440, 459, 497.01, 920, 424–427, 435, 500.1, 502.1, 503

[56] References Cited

U.S. PATENT DOCUMENTS

| | | | |
|---|---|---|---|
| 136,364 | 3/1873 | Conger | 210/264 |
| 183,424 | 10/1876 | Sinclaire | 210/90 |
| 417,766 | 12/1889 | Aspden | 210/284 |
| 627,594 | 6/1899 | Saunders | 210/94 |
| 847,518 | 3/1907 | Shiltz | 210/290 |
| 1,917,121 | 7/1933 | Hughson | 210/94 |
| 3,497,068 | 2/1970 | Hirsch . | |
| 3,900,395 | 8/1975 | Hirs | 210/290 |
| 3,937,662 | 2/1976 | Bartik | 210/93 |
| 4,197,205 | 4/1980 | Hirs | 210/275 |
| 4,260,426 | 4/1981 | Werfelman | 210/283 |
| 4,374,029 | 2/1983 | Jaisinghani | 210/275 |
| 4,568,463 | 2/1986 | Klein | 210/607 |
| 5,320,750 | 6/1994 | Krofta | 210/264 |

FOREIGN PATENT DOCUMENTS

| | | | |
|---|---|---|---|
| 2412007 A1 | 9/1975 | Germany | 210/275 |
| 1-315388 | 12/1989 | Japan . | |
| 1662626 | 7/1991 | U.S.S.R. | 210/290 |

*Primary Examiner*—Joseph W. Drodge
*Attorney, Agent, or Firm*—Richard C. Litman

[57] ABSTRACT

A water filtration system for residential homes having at least one U-shaped filter device, in the form of a tube, containing a three-layered particulate bed of a sand layer between anthracite layers held by end screens, for removing iron and manganese contaminants. Pressure gauges, an alarm element and a clarity analyzer containing a photocell are included in the system, for monitoring and controlling the filtration system.

18 Claims, 13 Drawing Sheets

WATER FILTRATION SYSTEM

BACKGROUND OF THE INVENTION

1. Field of the Invention

The present invention relates generally to a water filtration system for residential homes. More particularly, the water filtration system comprises one or more units of filtering U-shaped elements. Each filter element contains a three-layer bed of anthracite, sand and anthracite in particulate form held by end screens for removing iron and manganese contaminants. Also, pressure gauges, an alarm and a clarity analyzer containing a photocell are included in the system for monitoring and control. A backwashing procedure provides effective cleansing and regeneration of the water filtration system periodically. The filtration system can be housed in an insulated case with a lid on top and installed either in the ground, above the ground or in a basement.

2. Description of the Related Art

A common problem with household water is the excessive iron and manganese content which causes an objectional taste, a discoloration of the water, and accretion in the plumbing and washed clothes. The excessive contamination cannot always be eliminated by the local public water system. Therefore, pressure loss in house plumbing and outside pipes such as for repairs can cause the accreted contaminants to release and enter the water supply. There is, therefore, a need for an affordable, low-maintenance water filtration system for a dwelling. The design of the present invention includes screens which eliminates the loss of filter media during use and backwashing. It is known to reduce the chlorine taste of drinking water from a kitchen faucet by utilizing small portable activated charcoal units, but these units are inadequate to handle the incoming water supply of a dwelling.

The related art of interest describes various water filtration systems. The related art will be discussed in the order of perceived relevance to the present invention.

U.S. Pat. No. 3,497,068 issued on Feb. 24, 1970, to A. Adler Hirsch describes blended granular beds for water and wastewater filters. During the 1930's, dual bed filters containing an anthracite layer (1 mm. particles) on top of a sand layer (0.5 mm. particles) were used but discounted as not performing throughout the depth of the filter as a continuous unit. This fact was to be shown by a backwash catchment curve plotted in a FIG. 10 not present in the patent. Subsequently, a third finer and heavier layer of magnesite or garnet was added under the sand layer. This modification was considered disadvantageous as having a limited filter run and being less economical. Therefore, Hirsch shows the blending of fine and coarse granular material before placement and laid in shallow laminae in a downflow filter so that the average grain and pore size varies continuously and decreases with depth. The Hirsch filter is distinguishable for a large installation requiring a concrete filter box containing a specific blended filter bed over a gravel layer and an underdrain with downflow only of the unfiltered water.

U.S. Pat. No. 4,260,426 issued on April 7, to Daniel H. Werfelman describes a cylindrical deep bed filter for filtering food processing liquids. The tank (8 ft. high, 8 ft. diameter) has an inlet pipe on top and the outlet pipe at the bottom. A top screen, an intermediate movable (upward) media separator and a false bottom screen are provided and have the dimensions of #8 mesh, 0.032 in. square openings, and 8 ft. in diameter. The media separator separates a layer 2 ft. deep of #2 size anthracite from a packed bed of #50 size sand 4 ft. deep. During backwashing with air, caustic at pH 14, and air, the sand bed expands to elevate the movable media separator held by guides. The effluent Ph is maintained below 3 to prevent solubilization of the fats, oils and grease. The filter apparatus is distinguishable for its cylindrical, non-U-shaped structure and its essential movable intermediate screen required to separate the filter media.

U.S. Pat. No. 4,197,205 issued on Apr. 8, 1980, to Gene Hirs describes a vertical deep bed filter having multiple distinct layers starting from the bottom of sand, anthracite, nut or fruit shells, and a granular material comprising hydrophilic, hollow (spherical, cylindrical or frustroconical) silica beads dispersed in a matrix of cured cement. The deep bed layers must increase in density and decrease in size from top to bottom. The filter bed is distinguishable for its multiple different composition.

U.S. Pat. No. 4,374,029 issued on Feb. 15, 1983, to Rajan A. Jaisinghani describes a regenerative filter for removing oil from a ship's bilge water. The filter bed consists of a 6 in. layer of anthracite coal particles (0.75–0.85 mm.) over a 4 in. layer of silica sand grains (0.40–0.55 mm.) over a 20 in. layer of garnet sand (0.25–0.35 mm.). The filter bed is supported further by a five-layer bed starting from the top consisting of a first coarse rock layer (1 in. depth), first granite particle layer, a silica sand layer, a second granite particle layer, and a second coarse rock layer (3.5 in. depth). The filter is regenerated by backwashing with water, air, and water steps. The filter bed is distinguishable for its numerous layers for removing fuel oil from bilge water rather than the three-layer U-shaped filter of the present invention for filtering potable water.

U.S. Pat. No. 5,320,750 issued on Jun. 14, 1994, to Milos Krofts describes a two-stage water clarifier with a first filtrate isolation and improved backwashing and improved bubble generation. An inner cylindrical tank serves as a first stage flotation tank. The outer annular cylindrical tank serves as a second stage filtration tank with baffles in an upper region over a filter bed consisting of a sand layer (0.35 mm. diameter) under an anthracite layer (0.8–1.0 mm. diameter) with each layer 30 cm. in depth. The flotation water containing the sludge is filtered to supply backwashing water with compressed air. The two-stage water clarifier is distinguishable for the difference in structure and the use of only two layers of filter media.

Japan Patent Application No. 1-315388 published on Dec. 12, 1989, for Nittetsu Mining KK describes a sand filter for removing phosphorus from waste water comprising a ground cristobalite (0.5–3 mm.) layer below an anthracite layer and optionally above a zeolite layer to remove phosphoric acid values. The filter is distinguishable for its requirement for cristobalite which is quartz heated to 1200° C.

Russia Patent Application No. 1662626 published on Jul. 15, 1991, for Lvov Railway describes an effluent water contact clarifier tank using several layers of filtering grain with different grain sizes and with different layer heights. Seven gravel layers increasing in size from 10–20 mm. to 0.3–0.7 from the bottom are utilized with the bottom layer surrounding an apertured distribution pipe. The influent liquid traverses the filter bed from the bottom to an overflow region on top. The apparatus is distinguishable for utilizing seven gravel layers.

None of the above inventions and patents, taken either singularly or in combination, is seen to describe the instant invention as claimed. Thus, a water filtration system solving the aforementioned problems is desired.

SUMMARY OF THE INVENTION

The present invention is a water filtration system for residential homes comprising one or more U-shaped filters containing layered particulate bed of anthracite, sand and anthracite held by end screens for removing iron and manganese contaminants. The unique U-shaped configuration of an individual water filter further limits the loss of filter media during use and backwashing and regeneration. Pressure gauges, a warning element and a clarity analyzer containing a photocell are included in the system for monitoring and controlling the filtration system.

Accordingly, it is a principal object of the invention to provide a water filtration system for a dwelling which can be placed either in the ground, above the ground or in a basement.

It is another object of the invention to provide a water filtration system including at least one U-shaped filter element.

It is a further object of the invention to provide a water filtration system including pressure gauges and a clarity analyzer to monitor and control the filtration system.

Still another object of the invention is to provide a water filtration system including a facility for backwashing and regeneration.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention is directed to a water filtration device for a household and the like. The filtration unit can be either installed in the ground or above the ground outside the dwelling in an insulated cabinet having an accessible cover with the clarity analyzer and alarm installed inside the dwelling. The entire filtration system can be installed in a basement.

Figure 1:
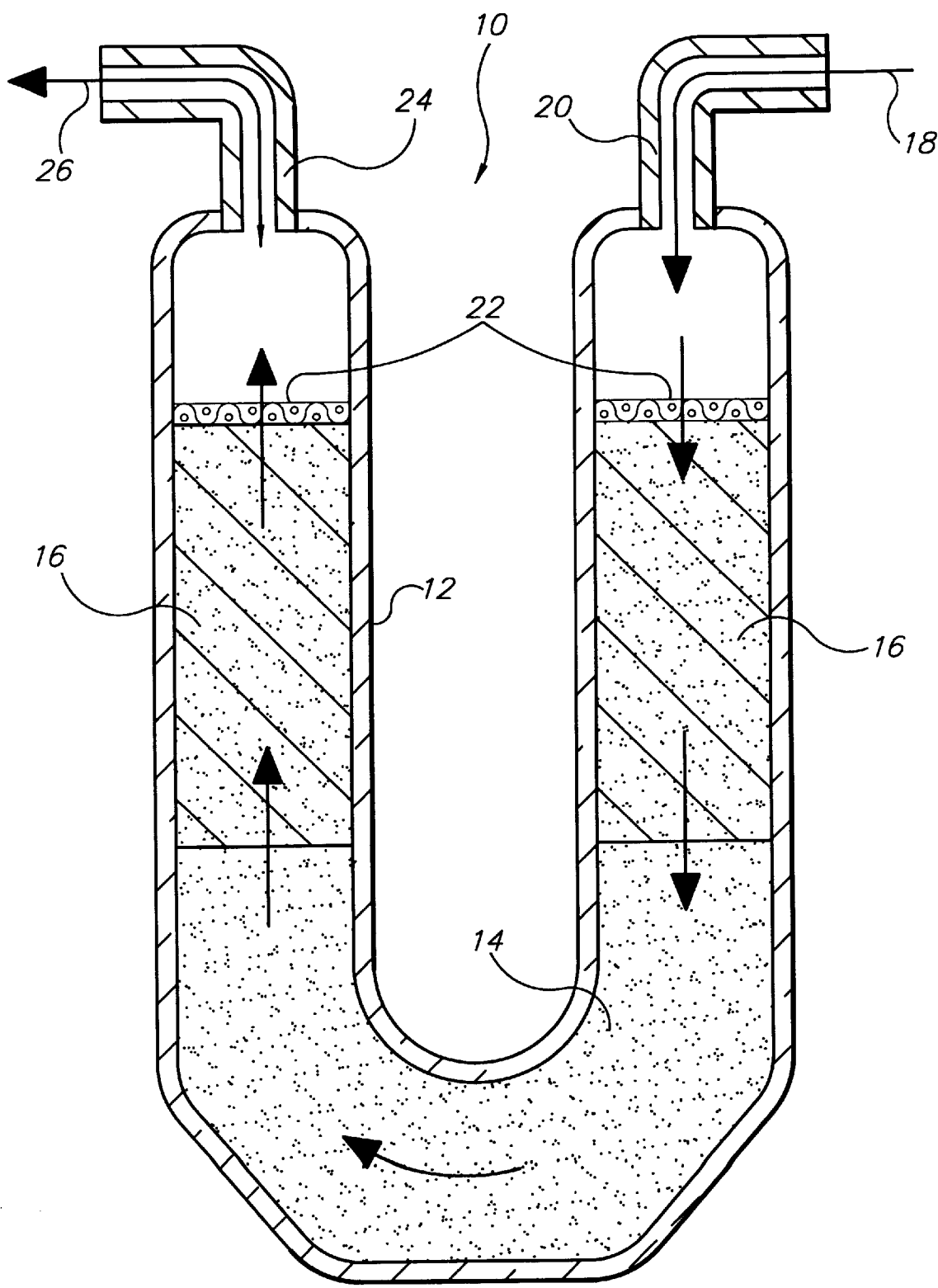
FIG. 1 is a schematic side view of a basic water filtration device according to the present invention.

FIG. 1 shows the basic filtration unit 10 of the present invention as a U-shaped tube 12 including a filter bed having a sand layer 14 sandwiched between particulate anthracite layers 16 for removing iron and manganese contaminants in the incoming water supply. The influent water 18 enters through the inlet pipe 20 and passes through a first metal or plastic screen 22, a first layer of anthracite 16, a sand layer 14, a second anthracite layer 16, and a second metal or plastic screen 22 to exit through the outlet pipe 24 as filtered effluent water 26 as shown by the directional arrows. The unique U-shape of the filter unit 10 contributes to an improved filtration of the particulate and dissolved contaminants in the incoming water supply.

Figure 2:
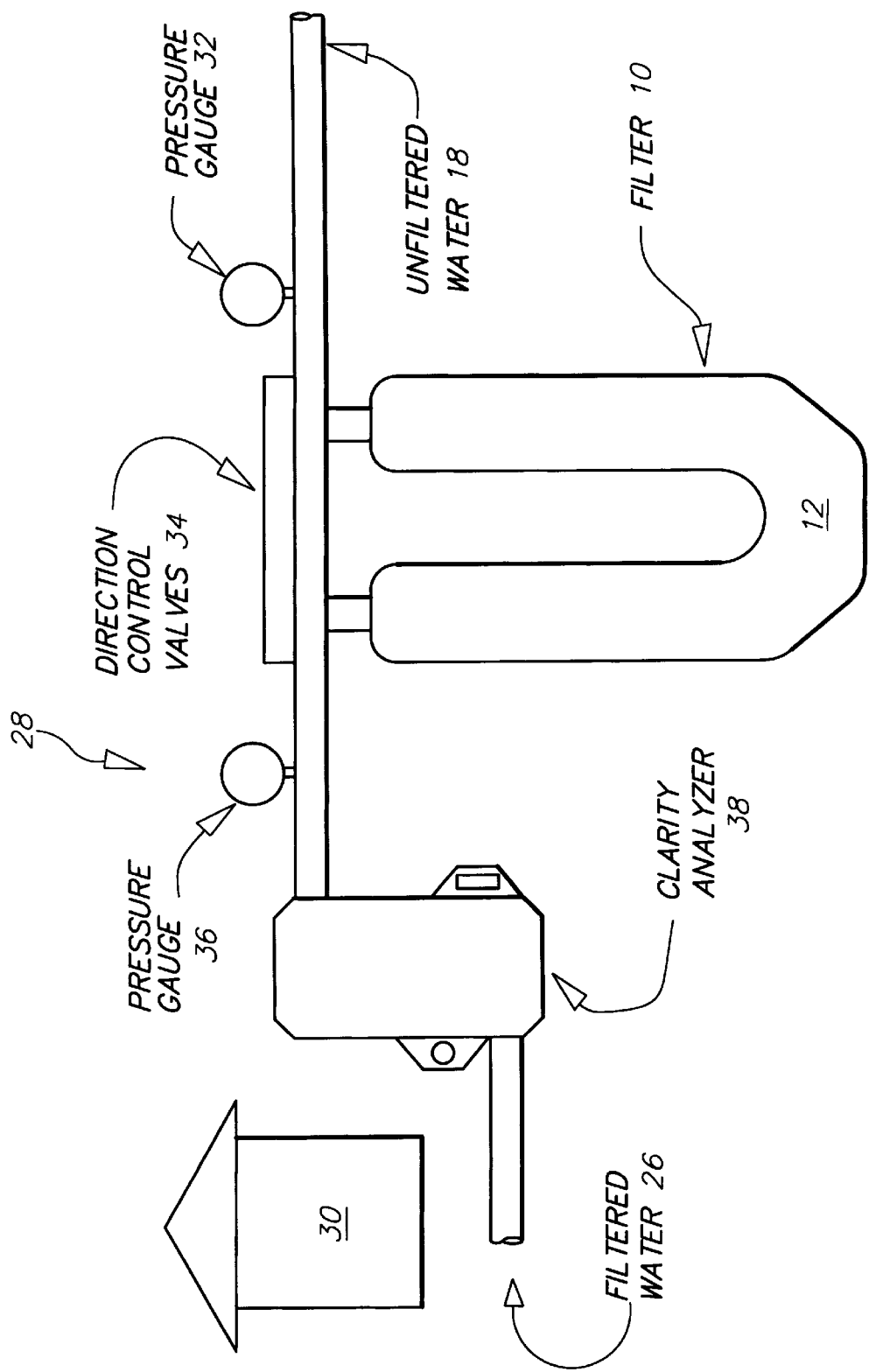
FIG. 2 is a schematic view of a basic water filtration system for a home.

FIG. 2 illustrates schematically the basic filtration system 28 for a house 30. The unfiltered tap water 18 enters the filtration system 28 in an inlet pipe 20, passes through a first inlet pressure gauge 32, through the filter unit 10 under control of the direction control valves 34, through the U-shaped filter 10, through a second outlet pressure gauge 36, through a clarity analyzer 38, and into the house 30 as filtered water 26.

Figure 3:
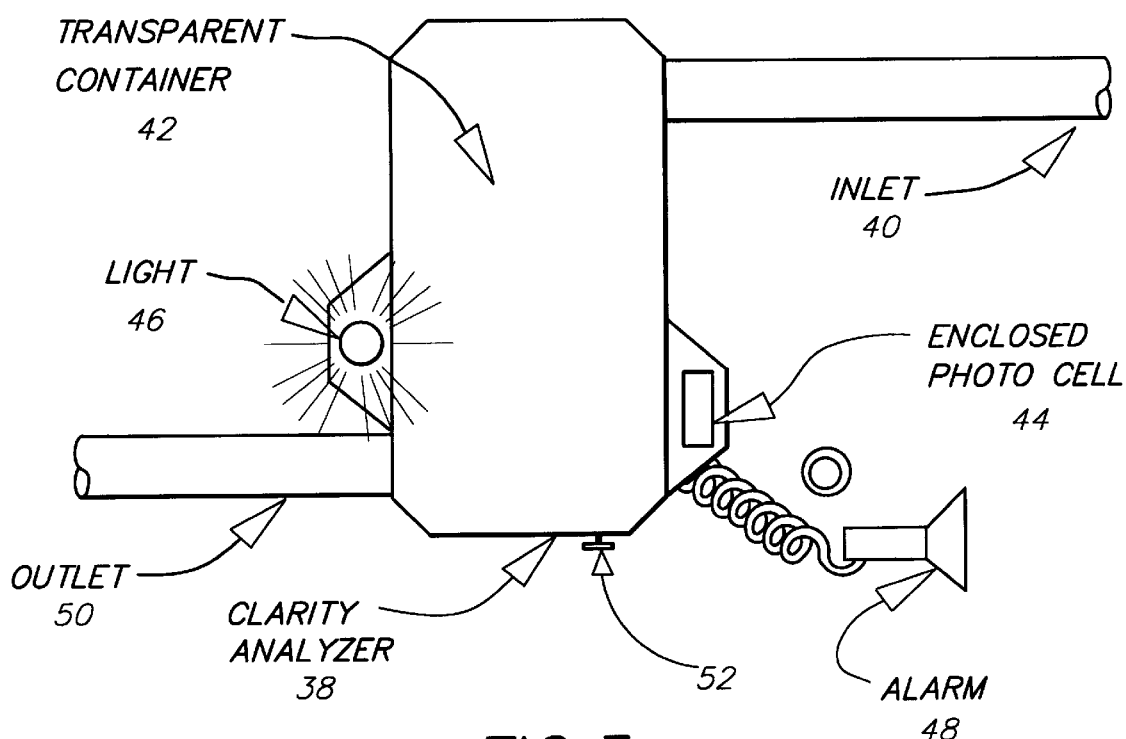
FIG. 3 is a schematic view of a water clarity analyzer and alarm system.

FIG. 3 shows the components of the clarity analyzer 38 with the inlet pipe 40 entering the transparent container 42. The filtered water flows through the clarity analyzer 38 and must pass the enclosed photocell 44 which receives light from the light source 46 to determine the extent of turbidity of the incoming water. If the photocell 44 measures turbidity above a certain desired predetermined value, an alarm 48 will be activated audibly and can optionally be shown on a computer if incorporated into the system. The water exits the clarity analyzer 38 through the outlet pipe 50. An electric solenoid valve 52 can be included to automatically stop the flow of filtered water on command from the photocell 44 and sound the alarm 48 for cutoff of the turbid water.

Figure 4:
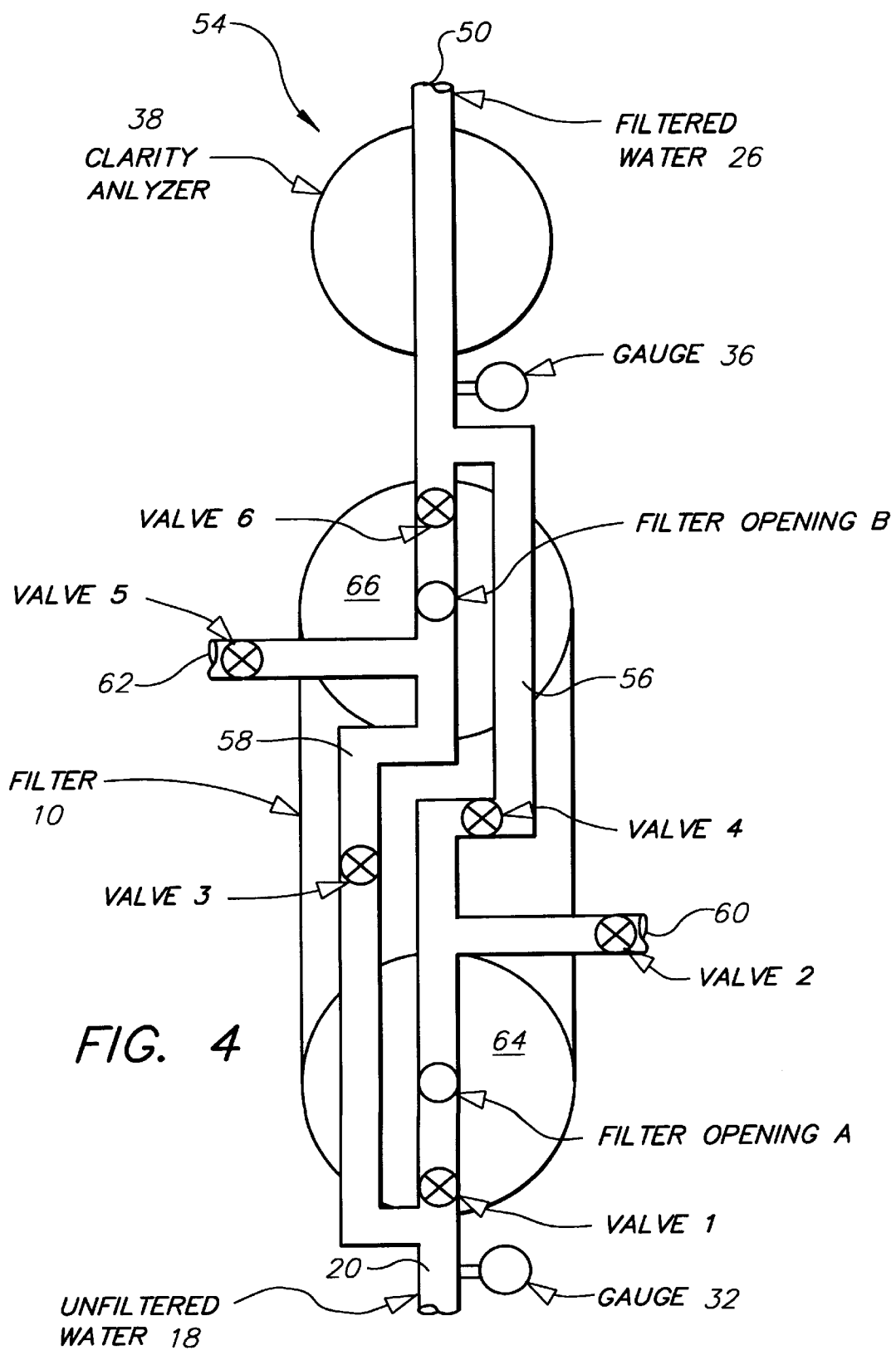
FIGS. 4 and 6–9 are schematic top plan views of a first embodiment of the present invention with only one water filtration device and showing the sequential operation.
Figure 5:
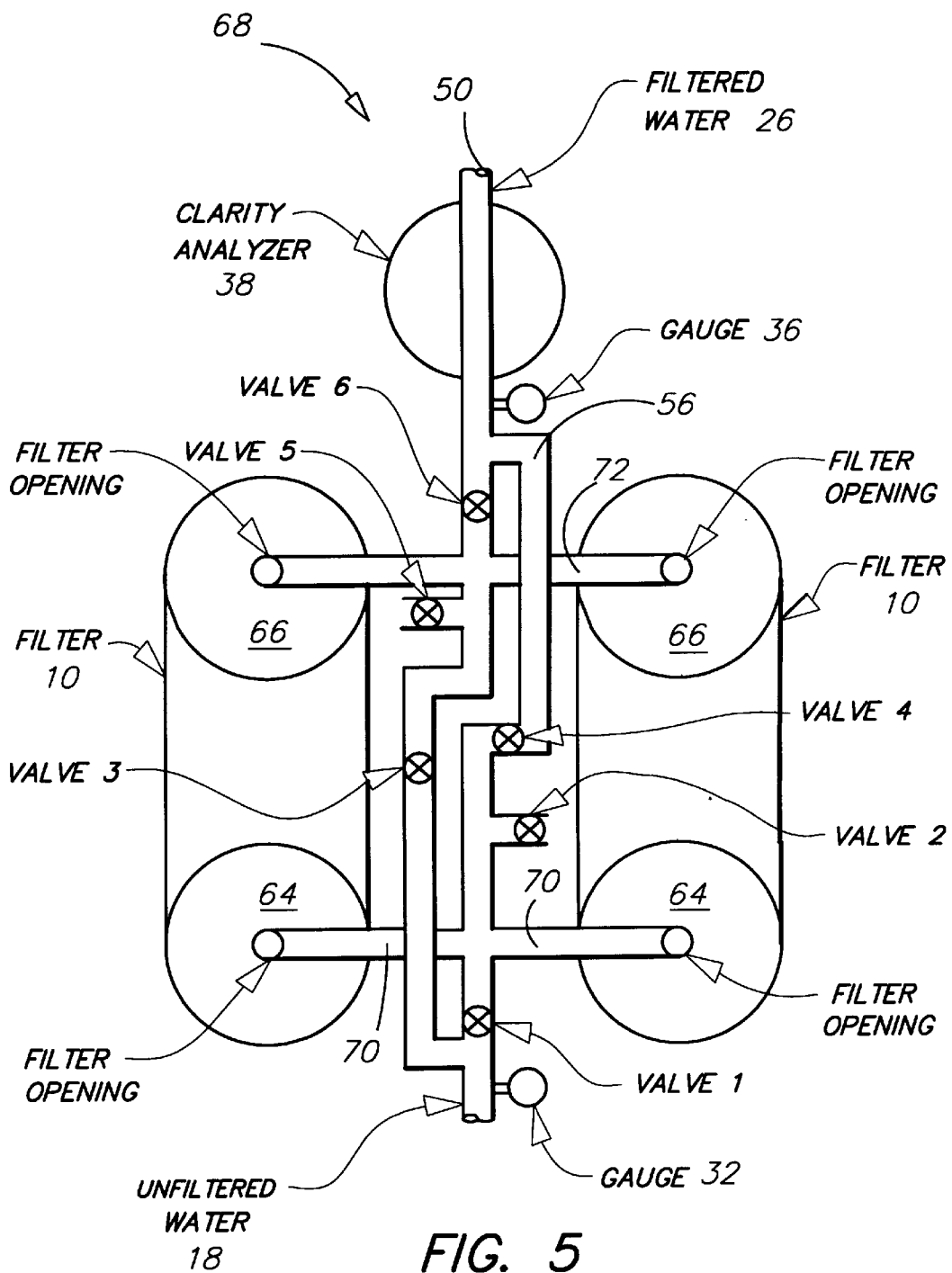
FIGS. 5 and 10–13 are schematic top plan views of a second embodiment of the present invention with two water filtration devices and showing the sequential operation.

Turning to FIGS. 4 and 6–9, a first embodiment of a single unit filtration system 54 will be described to illustrate the operation of this system. In FIG. 4, unfiltered water enters the system 54 with the first pressure gauge 32 measuring the influent water pressure. The water traverses either of two parallel pipes 56 (right) and 58 (left) depending on the shutoff valves 1–6. Pipe 60 leading off pipe 56 has valve 2. Pipe 62 leading off pipe 58 has valve 5. Valves 1 and 4 are in pipe 56. Valves 3 and 6 are in pipe 58. Filter openings A and B are respectively openings in front leg 64 and rear leg 66 of the filter 10. The right side parallel pipe 56 traverses the front leg 64, and the left side parallel pipe 58 traverses the rear leg 66.

Figure 6:
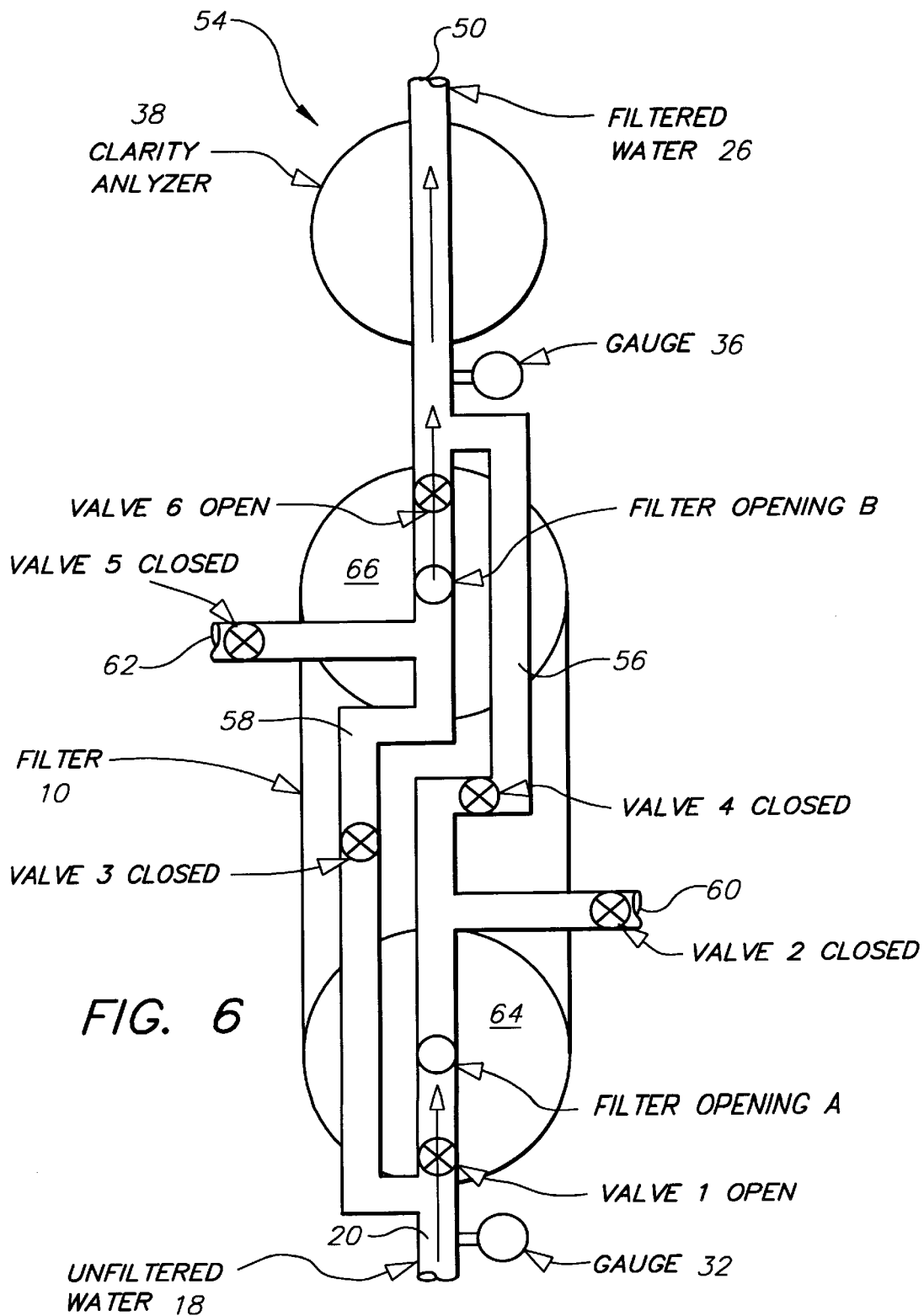
Figure 7:
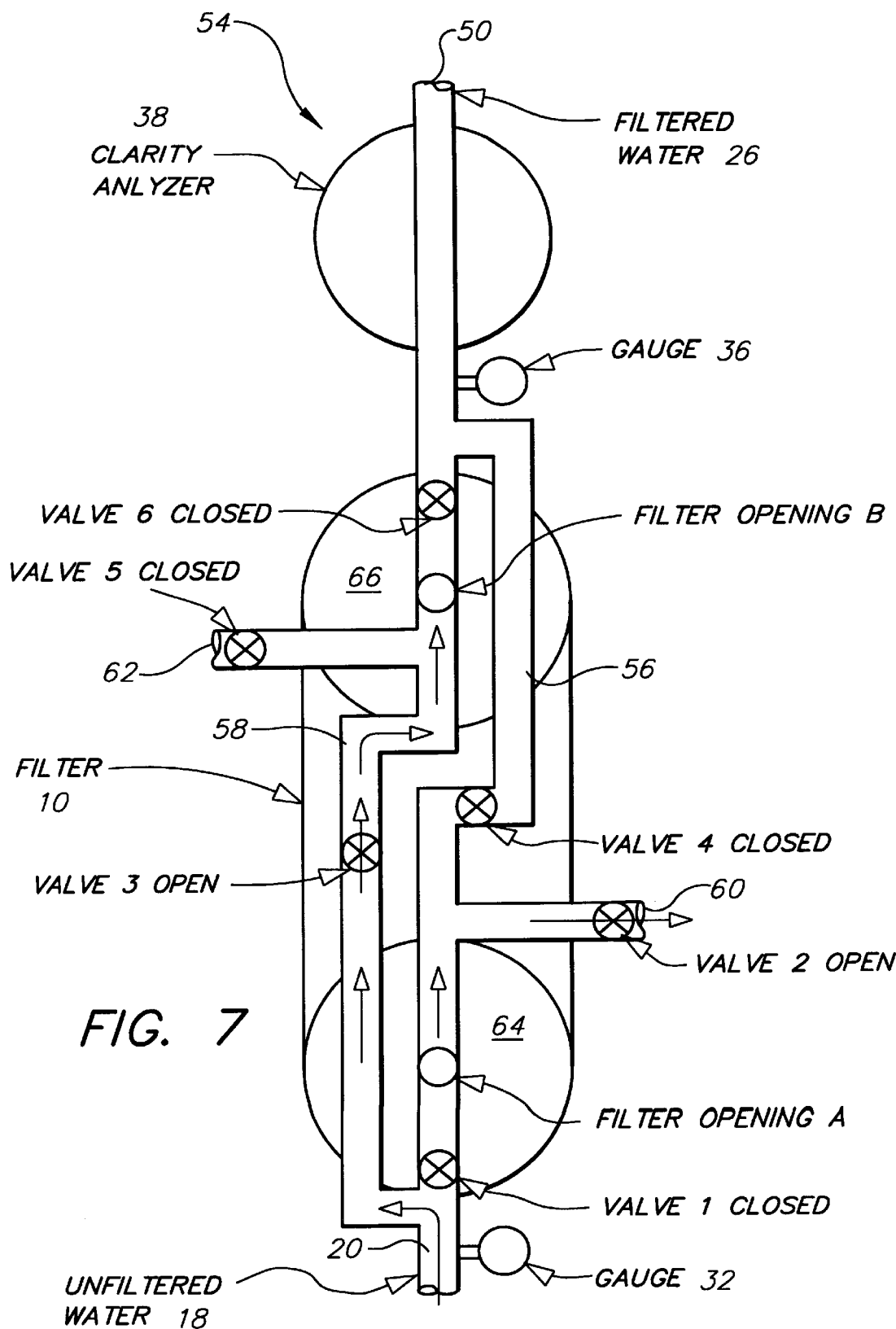
Figure 8:
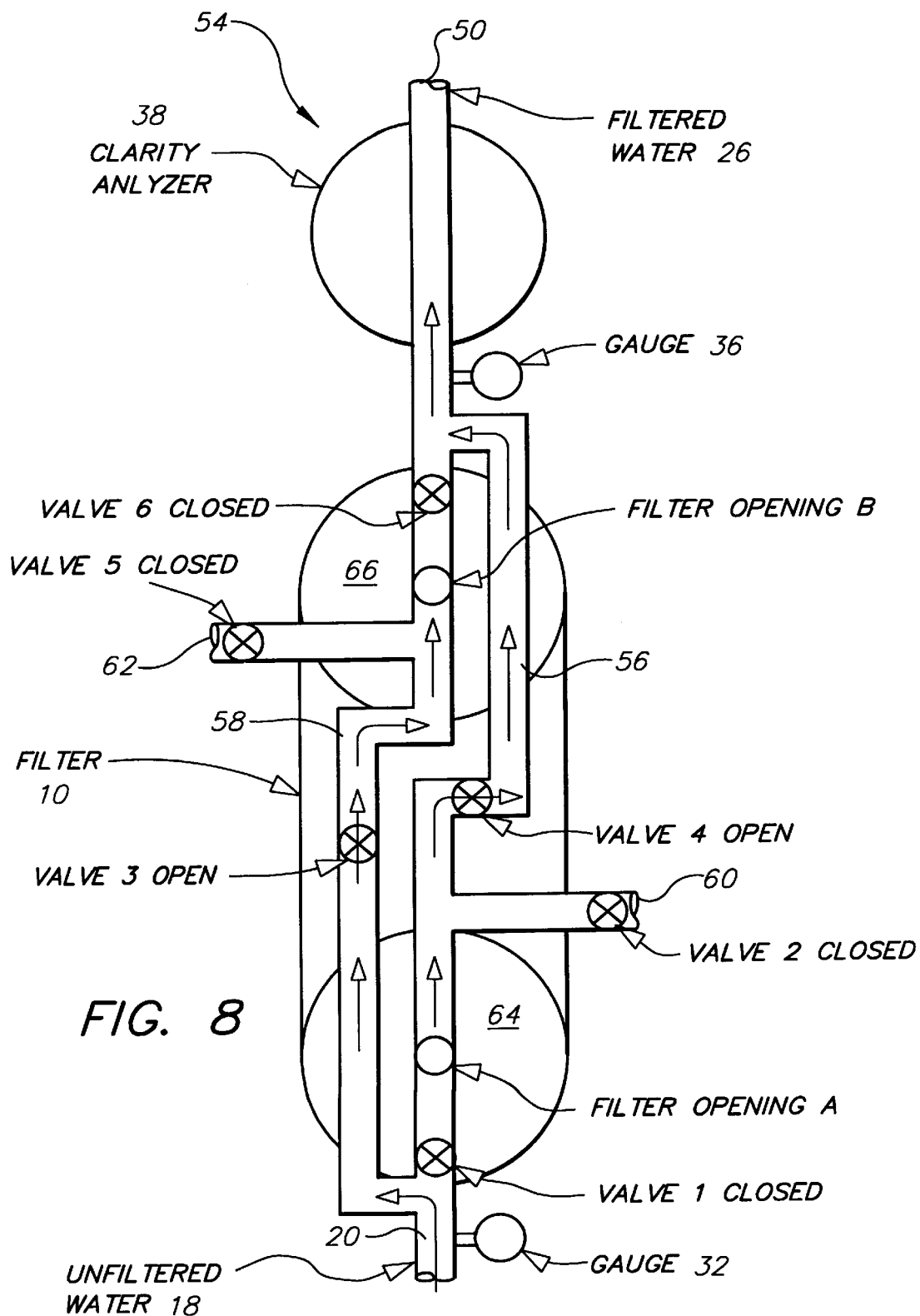
Figure 9:
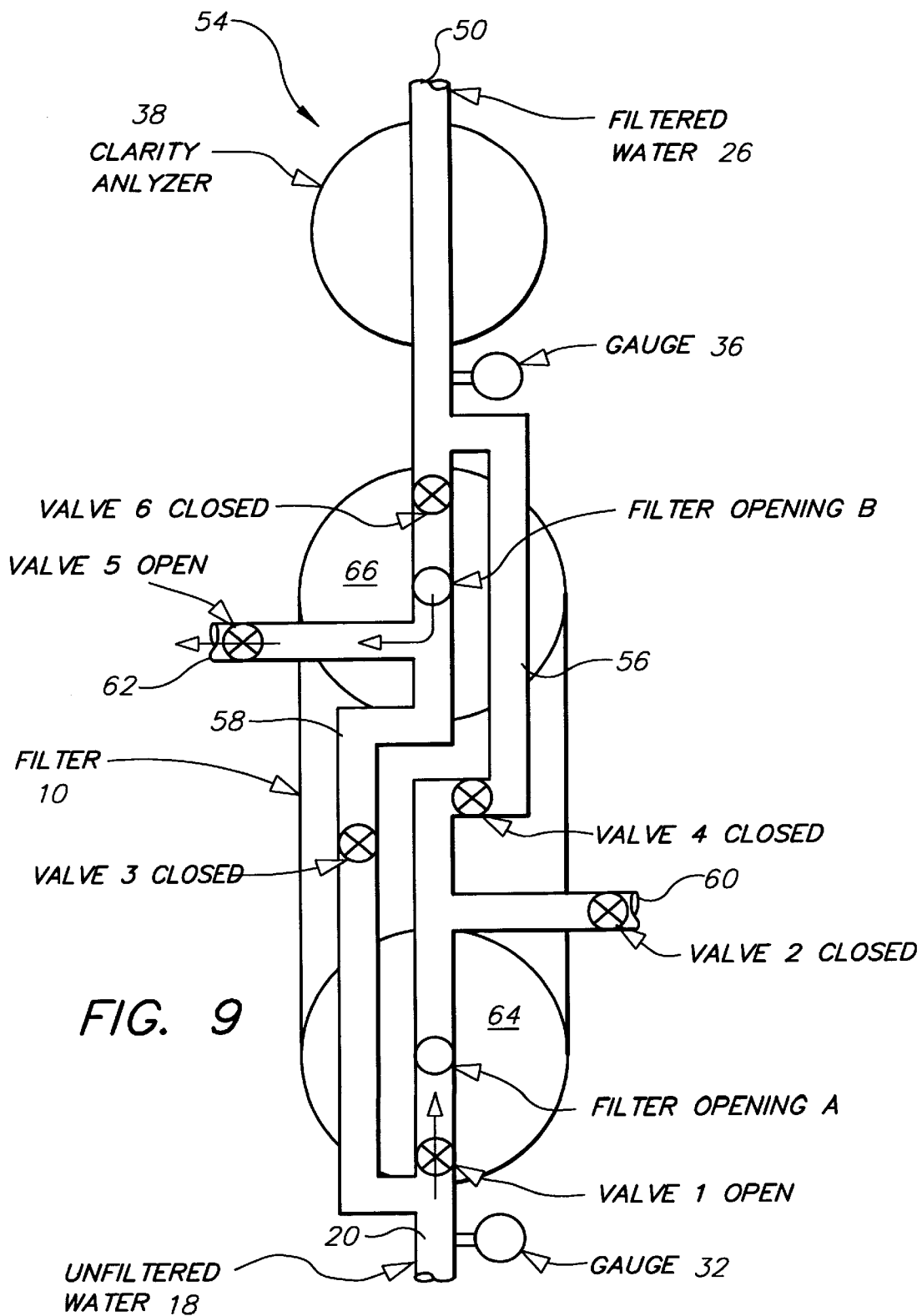
Figure 10:
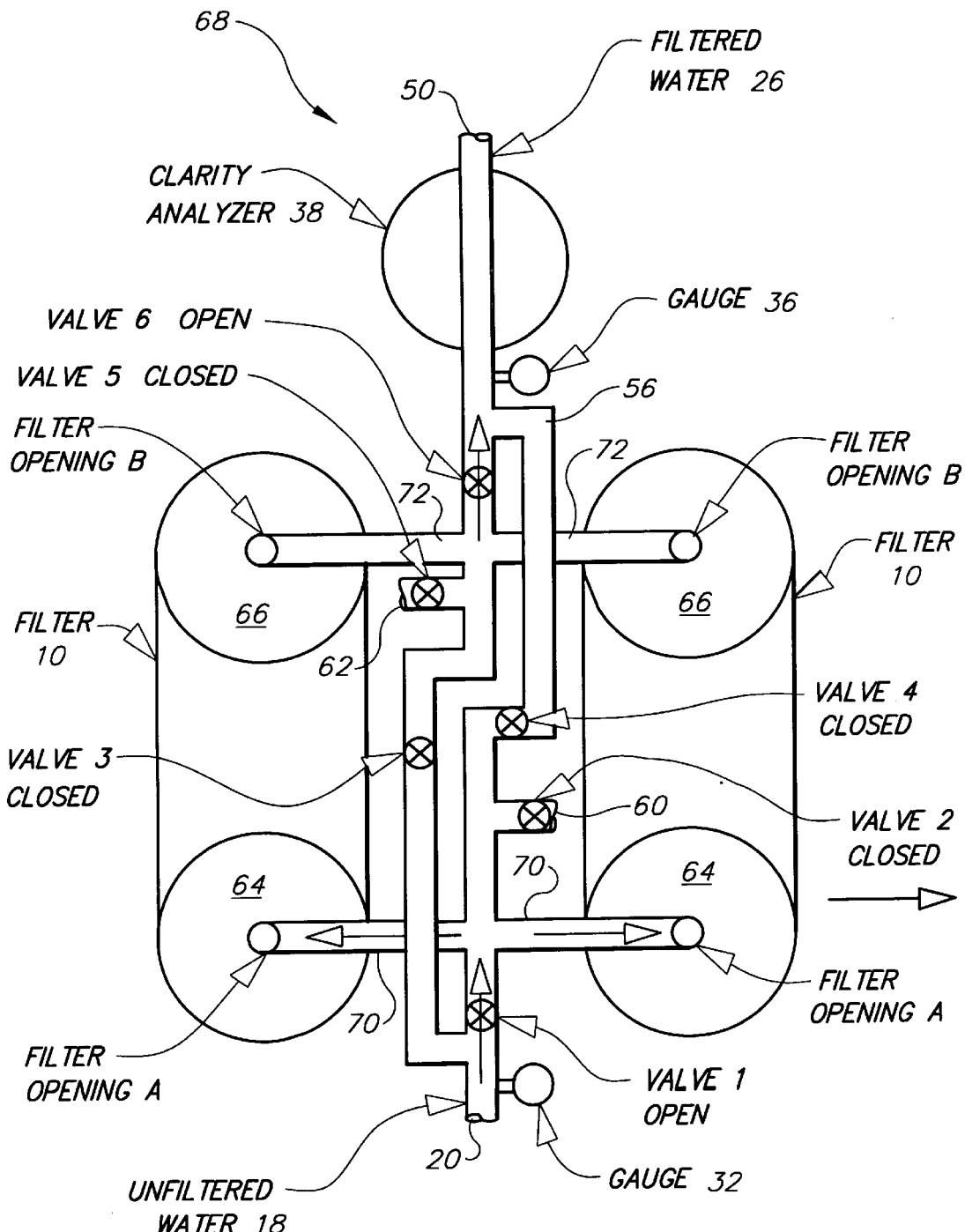
Figure 11:
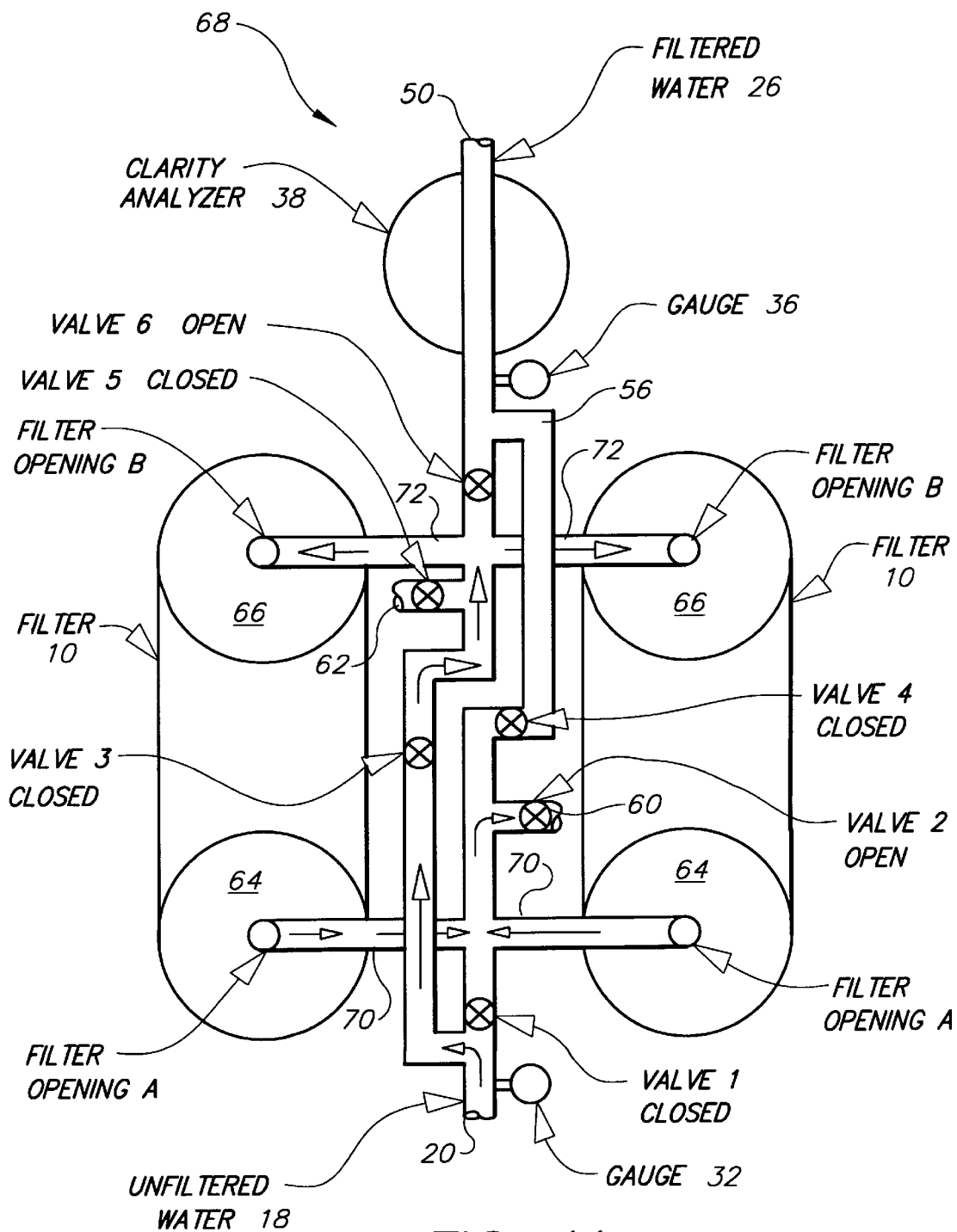
Figure 12:
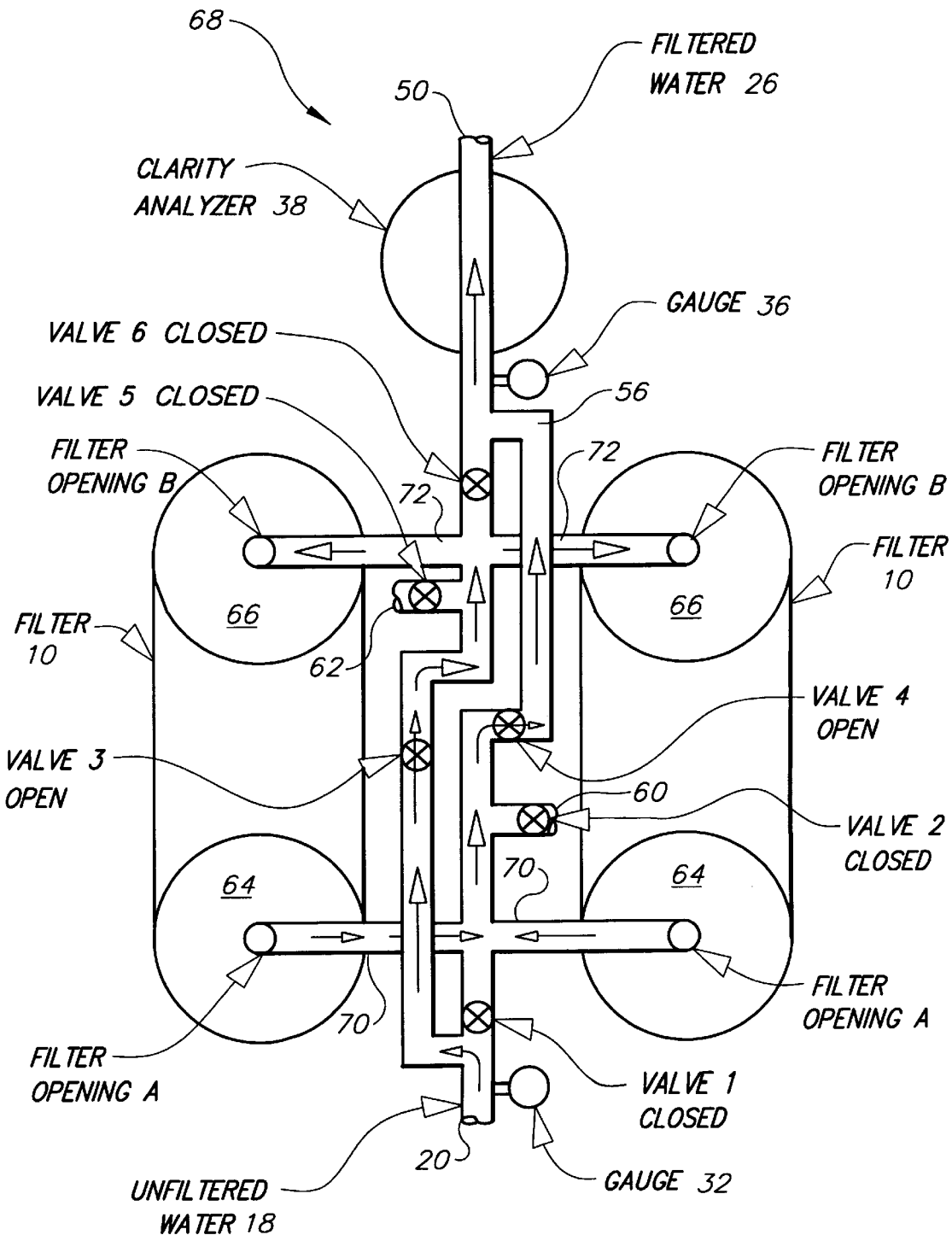
Figure 13:
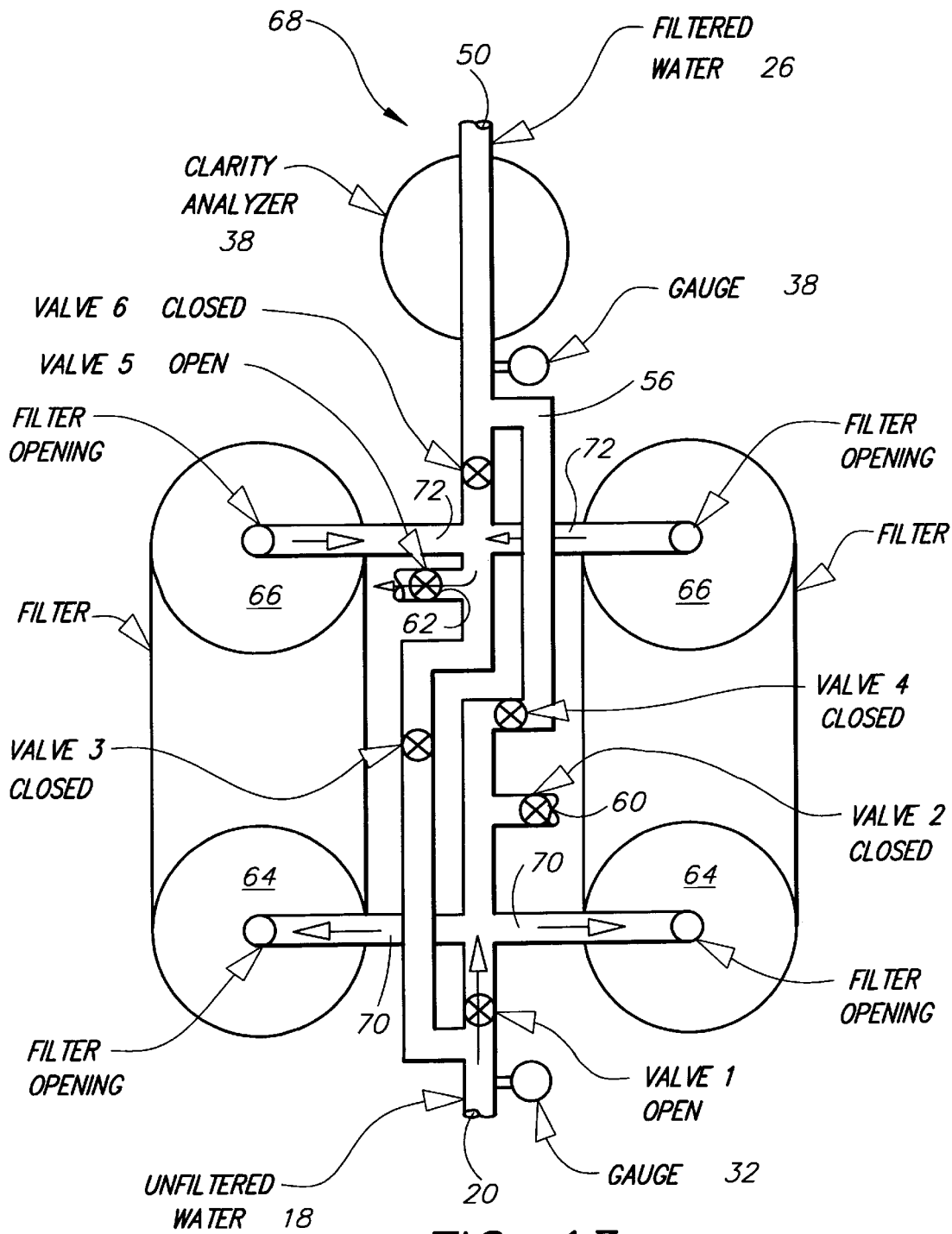

FIG. 6 shows the normal operating condition with only valves 1 and 6 open in a first stage of operation. FIG. 7 shows a backwashing of the filtration system by closing valves 1 and 6 and opening valves 2 and 3. Valve 2 is a blow-off valve and the water should be allowed to pass through valve 2 until it clears and then the valve should be closed. In a second stage of filtering in FIG. 8, valve 4 is opened in addition to the open valve 3. For backwashing in the second stage, valves 3 and 4 are closed and valves 1 and 5 are opened as shown in FIG. 9. Valve 5 is another blow-off valve and kept open until the water clears. Upon completion of the second stage backwashing step, the first stage filtering of FIG. 6 can begin another filtering cycle. Thus, FIGS. 4 and 6–9 illustrate the first embodiment utilizing only a single filter unit 10.

FIGS. 5 and 10–13 are a second embodiment of the filtration system 68 utilizing two U-shaped filtration units 10 in parallel with feed pipes 70 communicating with each front leg 64 and feed pipes 72 communicating downstream with each rear leg 66. The same operating procedure for opening and closing the valves 1–6 are performed for the two stages as explained for the first embodiment. In this embodiment it is clear that the filtering capacity has been doubled. It is noted that backwashing would be required when (1) there is a noticeable decrease in the flow rate of the filtered water; a pressure differential detected between gauges 32 and 36 under filtering operation; and (3) loss of filter performance.

The valves 1–6 can be manually operated or can be operated automatically by solenoid controls from a computer system. The filter media can readily be replaced by utilizing suitable removable connections between the pipe system and the filtration units 10.

It is to be understood that the present invention is not limited to the embodiment described above, but encompasses any and all embodiments within the scope of the following claims.

I claim:

1. A water filtration device comprising:

a U-shaped tube having a front leg portion, an arcuate bottom portion and a rear leg portion:

each said front leg portion and said rear leg portion containing a layer of anthracite particles and a screen for preventing said layer of anthracite particles from escaping; and said arcuate bottom portion containing a layer of sand, whereby tap water is filtered; and a clarity analyzer comprising a transparent container housing a photocell on one side and a light traversing a filtered water flow to impinge on said photocell on an opposite side for measuring turbidity of the filtered water, whereby the turbidity of the filtered water can be controlled.

2. The water filtration device according to claim 1, wherein said U-shaped tube is made of a material selected from the group consisting of plastic and glass.

3. The water filtration device according to claim 1, wherein said U-shaped tube is plastic.

4. The water filtration device according to claim 1, wherein said U-shaped tube is glass.

5. A water filtration system for a dwelling attached to an incoming water pipe comprising:

a first pressure gauge for measuring incoming water pressure;

at least one U-shaped filtering tube device having a front leg portion, an arcuate bottom portion and a rear leg portion:

each said front leg portion and said rear leg portion containing a layer of anthracite particles and a screen for preventing said layer of anthracite particles from escaping;

said arcuate bottom portion containing a layer of sand;

a second pressure gauge for measuring filtered water pressure; and a clarity analyzer comprising a transparent container housing a photocell on one side and a light traversing a filtered water flow to impinge on said photocell on an opposite side for measuring turbidity of the filtered water;

whereby the turbidity of the filtered water can be controlled.

6. The water filtration system according to claim 5, further comprising a plurality of direction control valves which control the direction of water flow through said front and rear leg portion of the at least one filtering tube device.

7. The water filtration system according to claim 5, wherein said water filtration system includes a housing in the form of an insulated container having an accessible cover.

8. The water filtration system according to claim 7, wherein said insulated container for the water filtration system is dimensioned and configured to be positioned in a basement of the dwelling.

9. The water filtration system according to claim 7, wherein said insulated container for the water filtration system is adapted to be positioned outside the dwelling on the ground.

10. The water filtration system according to claim 7, wherein said insulated container for the water filtration system is adapted to be positioned outside the dwelling in the ground.

11. The water filtration system according to claim 5, wherein said clarity analyzer includes an audible alarm for notification of undue turbidity of the filtered water.

12. The water filtration system according to claim 5, including a parallel pipe system comprising:

a first parallel pipe for passing incoming water to said front leg portion; and a second parallel pipe for passing backwashing water to said rear leg portion.

13. The water filtration system according to claim 12, including a third outlet pipe connected to said first parallel pipe between said front and rear leg portions.

14. The water filtration system according to claim 12, including a fourth outlet pipe connected to said second parallel pipe between said front and rear leg portions.

15. A water filtration system for a dwelling attached to an incoming water pipe comprising:

a first pressure gauge for measuring incoming water pressure;

at least two transparent U-shaped filtering tube devices with each device having a front leg portion, an arcuate bottom portion and a rear leg portion:

each said front leg portion and said rear leg portion containing a layer of anthracite particles and a screen for preventing said layer of anthracite particles from escaping;

said arcuate bottom portion containing a layer of sand;

a second pressure gauge for measuring filtered water pressure; and a clarity analyzer comprising a transparent container housing a photocell on one side and a light traversing a filtered water flow to impinge on said photocell on an opposite side for measuring turbidity of the filtered water;

whereby the turbidity of the filtered water is controlled.

16. The water filtration system according to claim 15, including a parallel pipe system comprising;

a first parallel pipe for passing incoming water to said front leg portion; and a second parallel pipe for passing backwashing water to said rear leg portion.

17. The water filtration system according to claim 16, including a third outlet pipe connected to said first parallel pipe between said front and rear leg portions.

18. The water filtration system according to claim 16, including a fourth outlet pipe connected to said second parallel pipe between said front and rear leg portions.

* * * * *